(12) United States Patent
Kim et al.

(10) Patent No.: US 9,478,385 B2
(45) Date of Patent: Oct. 25, 2016

(54) FIELD EMISSION DEVICE HAVING FIELD EMITTER INCLUDING PHOTOELECTRIC MATERIAL AND METHOD OF MANUFACTURING THE SAME

(71) Applicant: Electronics and Telecommunications Research Institute, Daejeon (KR)

(72) Inventors: Jae-woo Kim, Daejeon (KR); Yoon-Ho Song, Daejeon (KR); Jin Woo Jeong, Daejeon (KR); Jun Tae Kang, Daegu (KR); Sungyoul Choi, Ulsan (KR); Jeong Yong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 261 days.

(21) Appl. No.: 14/339,004

(22) Filed: Jul. 23, 2014

(65) Prior Publication Data
US 2015/0146865 A1 May 28, 2015

(30) Foreign Application Priority Data

Nov. 26, 2013 (KR) .......................... 10-2013-0144622
Feb. 12, 2014 (KR) .......................... 10-2014-0016088

(51) Int. Cl.
*H01J 9/02* (2006.01)
*H01J 1/304* (2006.01)
*H01J 1/34* (2006.01)
*H01J 35/06* (2006.01)
*B82Y 30/00* (2011.01)

(52) U.S. Cl.
CPC ................. *H01J 1/304* (2013.01); *H01J 1/34* (2013.01); *H01J 35/065* (2013.01); *B82Y 30/00* (2013.01); *H01J 2201/30469* (2013.01); *H01J 2201/3423* (2013.01); *Y10S 977/742* (2013.01); *Y10S 977/939* (2013.01)

(58) Field of Classification Search
CPC ............................... H01J 35/065; H01J 9/025
USPC ................................. 313/310, 311, 336, 351
See application file for complete search history.

(56) References Cited

U.S. PATENT DOCUMENTS

| | | | |
|---|---|---|---|
| 8,531,096 | B2 | 9/2013 | Son et al. |
| 2007/0235717 | A1 | 10/2007 | Heo et al. |
| 2008/0299298 | A1 | 12/2008 | Kim et al. |
| 2013/0228792 | A1 | 9/2013 | Shim et al. |

FOREIGN PATENT DOCUMENTS

| | | |
|---|---|---|
| KR | 10-2006-0072460 A | 6/2006 |
| KR | 10-0911370 B1 | 8/2009 |
| KR | 10-2010-0076801 A | 7/2010 |
| KR | 10-2013-0101297 A | 9/2013 |

*Primary Examiner* — Vip Patel

(57) ABSTRACT

Provided are a field emission device and a method of manufacturing the same. The field emission device includes an anode electrode and a cathode electrode which are opposite to each other, a counter layer provided on the anode electrode, and a field emitter provided on the cathode electrode and facing the counter layer. Herein, the field emitter includes a carbon nanotube emitting cold electrons and a photoelectric material emitting photo electrons.

20 Claims, 17 Drawing Sheets

FIELD EMISSION DEVICE HAVING FIELD EMITTER INCLUDING PHOTOELECTRIC MATERIAL AND METHOD OF MANUFACTURING THE SAME

CROSS-REFERENCE TO RELATED APPLICATIONS

This U.S. non-provisional patent application claims priority under 35 U.S.C. §119 of Korean Patent Application Nos. 10-2013-0144622, filed on Nov. 26, 2013, and 10-2014-0016088, filed on Feb. 12, 2014, the entire contents of which are hereby incorporated by reference.

BACKGROUND

The present invention disclosed herein relates to a field emission device, and more particularly, to a field emission device having a field emitter including a photoelectric material and a method of manufacturing the same.

Field emission devices have a structure in which electrons are emitted by applying an electric field to a field emitter in a vacuum state and the emitted electrons are accelerated toward a positive electrode. Field emission devices use light or X-rays generated during collision of electrons.

Performance of a field emission device greatly depends on a field emitter capable of emitting electrons. Representative examples of devices using a high-performance field emitter may include cold-cathode X-ray tubes, field emission lamps, field emission displays, traveling wave tubes, terahertz generators, and the like. Among them, cold-cathode X-ray tubes, traveling wave tubes, and terahertz generators require high current or high current density.

In the case of devices described above, since high current density is required and the number of electrons emitted from each field emitter has to increase to obtain the high current density, Joule heating may occur in the field emitter. When Joule heating occurs, the field emitter is deteriorated and thus incapable of acting as a field emitter. Accordingly, it is difficult to expect a desirable service life or stability necessary for field emission devices.

SUMMARY

The present invention provides a field emission device including a field emitter having excellent properties, and a method of manufacturing the same.

The present invention also provides a field emission device including a field emitter capable of providing high current density and a method of manufacturing the same.

To this end, a field emission device and a method of manufacturing the same are characterized by having a field emitter including a photoelectric material.

Embodiments of the present invention provide a field emission device including an anode electrode and a cathode electrode which are opposite to each other, a counter layer provided on the anode electrode, and a field emitter provided on the cathode electrode and facing the counter layer, wherein the field emitter includes a carbon nanotube that emits cold electrons and a photoelectric material that emits photo electrons.

In some embodiments, the device may further include a first photoelectric material layer provided between the cathode electrode and the field emitter, wherein the first photoelectric material layer may totally or partially cover a surface of the cathode electrode, the surface of the cathode electrode facing the anode electrode.

In other embodiments, at least one of the photoelectric material and the first photoelectric material layer may include one of potassium oxide, cesium oxide, gallium phosphide, gallium nitride, aluminum, indium arsenide, germanium, silicon, gallium arsenide, cesium telluride, cesium iodide, cesium-potassium-tellurium (Cs—K—Te), potassium-tellurium (K—Te), silver-oxygen-cesium (Ag—O—Cs), indium-gallium-arsenic (In—Ga—As), and a combination thereof.

In still other embodiments, the counter layer may include one of a florescent layer and a metallic target.

In even other embodiments, the device may further include a gate electrode provided between the cathode electrode and the anode electrode.

In yet other embodiments, the device may further include a second photoelectric material layer provided on a surface of the gate electrode, the surface of the gate electrode facing the anode electrode.

In further embodiments, the device may further include a first photoelectric material layer provided between the cathode electrode and the field emitter, wherein the second photoelectric material layer may include the same material as the first photoelectric material layer.

In still further embodiments, the second photoelectric material layer may totally or partially cover the surface of the gate electrode facing the anode electrode.

In even further embodiments, the field emitter may include a plurality of local field emitters distributed on the cathode electrode.

In yet further embodiments, the gate electrode may include a plurality of holes aligned with the plurality of local field emitters.

In much further embodiments, the field emitter may further include nanowires and the nanowires each may include one of gold (Au), silver (Ag), gallium arsenide, and a combination thereof.

In other embodiments of the present invention, the field emission device may include an anode electrode provided with a counter layer, a cathode electrode spaced from the anode electrode and provided with a field emitter facing the counter layer, and a first photoelectric material layer provided between the cathode electrode and the field emitter, wherein the field emitter includes a field emission paste formed by melting and curing a photoelectric material and metal particles and a carbon nanotube provided on the field emission paste and projecting from the field emitter toward the anode electrode. Also, cold electron emission caused by a field effect is generated from the carbon nanotube and photo electron emission caused by incident light is generated from the photoelectric material.

In some embodiments, the field emitter may further include nanowires provided on the field emission paste, and the nanowires projecting from the field emission paste.

In other embodiments, the device may further include a gate electrode provided between the cathode electrode and the anode electrode and spaced from the cathode electrode and the anode electrode, wherein the gate electrode includes a gate hole. The cold electron emission and the photo electron emission may pass through the gate hole.

In still other embodiments, the device may further include a second photoelectric material layer totally or partially covering a surface of the gate electrode, the surface of the gate electrode facing the anode electrode, wherein the second photoelectric material layer may include the same material as the first photoelectric material.

In still other embodiments of the present invention, a method of manufacturing a field emission device may include: forming a carbon nanotube paste, which consists of carbon nanotubes, a photoelectric material, metal particles, an organic binder, and a solvent, on a cathode electrode; removing the solvent by drying the carbon nanotube paste; removing the organic binder by firing the carbon nanotube paste and melting the photoelectric material and the metal particles; and treating a field emitter formed by melting the photoelectric material and the metal particles to allow a surface of the field emitter to be activated, wherein the photoelectric material includes a material having a lower critical frequency than a frequency of light incident on the field emitter.

In some embodiments, the photoelectric material may include one of potassium oxide, cesium oxide, gallium phosphide, gallium nitride, aluminum, indium arsenide, germanium, silicon, gallium arsenide, cesium telluride, cesium iodide, cesium-potassium-tellurium (Cs—K—Te), potassium-tellurium (K—Te), silver-oxygen-cesium (Ag—O—Cs), indium-gallium-arsenic (In—Ga—As), and a combination thereof.

In other embodiments, the method may further include providing an anode electrode opposite to the cathode electrode and forming a counter layer on the anode electrode to face the field emitter, wherein the counter layer may include one of a fluorescent layer and a metallic target.

In still other embodiments, the method may further include, before the forming of the carbon nanotube paste, forming a first photoelectric material layer on the cathode electrode.

In even other embodiments, the method may further include: forming a gate electrode between the cathode electrode and the anode electrode, which are separated spatially; and forming, on the gate electrode, a second photoelectric material layer facing the counter layer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF EXEMPLARY EMBODIMENTS

Figure 1A:
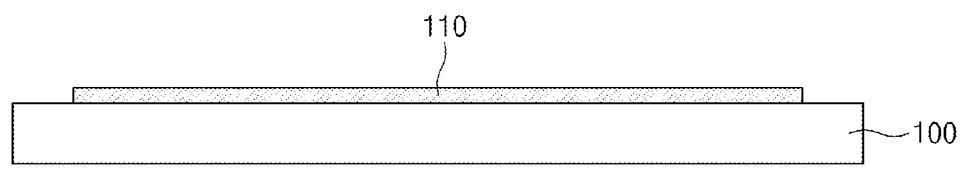
FIGS. 1A to 1E are cross-sectional views illustrating a method of manufacturing a field emitter according to an embodiment of the present invention.

Hereinafter, a field emission device having a field emitter including a photoelectric material and a method of manufacturing the same will be described in detail with reference to the attached drawings.

Advantages of the embodiments compared with general technologies will be apparent through a detailed description with reference to the drawings and following claims. Particularly, the present invention will be well pointed out and clearly defined in the claims. However, the present invention will be best understood by referring to the following detailed description related to the attached drawings. Throughout the drawings, like reference numerals refer to like elements.

<Example Of Method Of Manufacturing Field Emitter>

FIGS. 1A to 1E are cross-sectional views illustrating a method of manufacturing a field emitter according to an embodiment of the present invention. FIG. 1F is a cross-sectional view illustrating a modified example of FIG. 1E.

Referring to FIG. 1A, a cathode electrode 100 may be provided. The cathode electrode 100 may include metal such as nickel (Ni), cobalt (Co), copper (Cu), gold (Au), silver (Ag) and an alloy thereof. As another example, the cathode electrode 100 may include a transparent conductor made of, for example, silicon-based material or indium tin oxide (ITO). A photoelectric material layer 110 may be formed on the cathode electrode 100 through screen printing, dipping, sputtering, or chemical vapor deposition.

The photoelectric material layer 110 may include a material capable of emitting electrons when light is incident thereon. For example, the photoelectric material layer 110 may include potassium oxide, cesium oxide, gallium phosphide, gallium nitride, aluminum, indium arsenide, germanium, silicon, gallium arsenide, cesium telluride, cesium iodide, cesium-potassium-tellurium (Cs—K—Te), potassium-tellurium (K—Te), silver-oxygen-cesium (Ag—O—Cs), indium-gallium-arsenic (In—Ga—As), or a combination thereof.

Figure 1B:
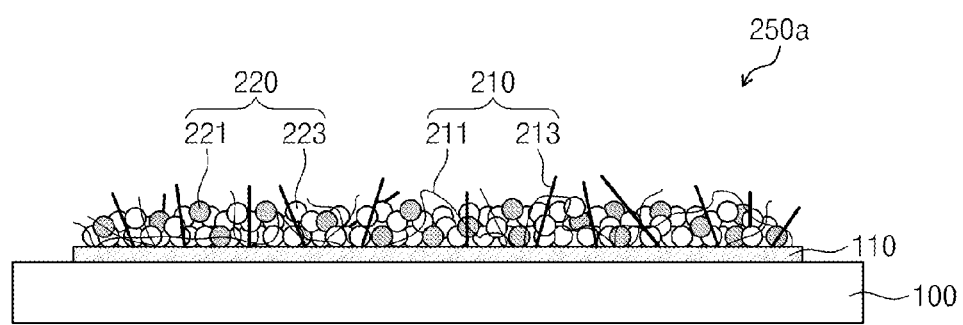

Referring to FIG. 1B, a carbon nanotube paste 250a may be provided on the photoelectric material layer 110. The carbon nanotube paste 250a may include a field emission source 210, an inorganic filler 220, an organic binder, and a solvent. When forming the carbon nanotube paste 250a, the field emission source 210, the inorganic filler 220, and/or the organic binder may be added in the form of powder or a paste. According to an example, the carbon nanotube paste 250a may be applied to the photoelectric material layer 110 through screen printing or dipping.

The field emission source 210 may include a carbon nanotube (CNT) 211 such as a single-walled carbon nanotube (SWCNT), a multi-walled carbon nanotube (MWCNT), a dual-walled nanotube (DWCNT), a thin-MWCNT, and a combination thereof.

The CNT has a geometrical structure with a low work function and a high aspect ratio. Accordingly, the CNT may have relatively more excellent field emission properties. The principle of field emission is as follows: when an electric field is applied to an emitter, the electric field is concentrated on the emitter to cause electrons to be emitted. The CNT 211 has a relatively higher field enhancement factor, thereby easily emitting electrons even under a low electric field.

In addition to the CNT 211, the field emission source 210 may further include a nanowire 213. The nanowire 213 may include Au, Ag, gallium arsenide, or a combination thereof. The nanowire 213 has a geometrical structure with a high aspect ratio and a relatively lower work function, so that the nanowire 213 may be used as the field emission source 210.

The inorganic filler 220 may include a micro- or nano-sized photoelectric material 221 and nanoparticles 223 formed of metal, a metal compound, a carbide-based material, or a combination thereof.

The photoelectric material 221 may include a material which may have a characteristic critical frequency lower than a frequency of incident photon thereby emitting electrons by incident light. As an example, the photoelectric material 221, as identically or similarly to the photoelectric material layer 110, may include potassium oxide, cesium oxide, gallium phosphide, gallium nitride, aluminum, indium arsenide, germanium, silicon, gallium arsenide, cesium telluride, cesium iodide, cesium-potassium-tellurium (Cs—K—Te), potassium-tellurium (K—Te), silver-oxygen-cesium (Ag—O—Cs), indium-gallium-arsenic (In—Ga—As), or a combination thereof.

The metal forming the nanoparticles 223 may include nickel (Ni), tantalum (Ta), copper (Cu), titanium (Ti), lead (Pb), zinc (Zn), gold (Au), iron (Fe), silver (Ag) or a combination thereof. The carbide material forming the nanoparticles 223 may include silicon carbide (SiC), titanium carbide (TiC), hafnium carbide (HfC), zirconium carbide (ZrC), tungsten carbide (WC), chrome carbide ($Cr_xC_y$), molybdenum carbide ($Mo_3C_2$), or a combination thereof.

The organic binder may include acrylates, acryl, cellulose material, or a combination thereof. The solvent may include isopropyl alcohol (IPA), terpineol, or a combination thereof. According to an example, the organic binder may include ethylcellulose and the solvent may include terpineol.

Figure 1C:
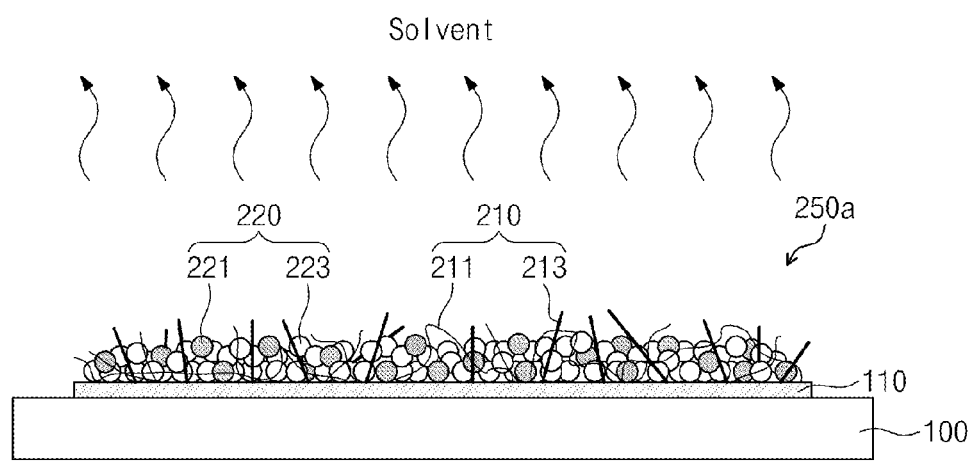

Referring to FIG. 1C, the carbon nanotube paste 250a may be dried. For example, in an atmosphere, the carbon nanotube paste 250a may be heat-treated at a temperature of from about 90° C. to about 120° C. The solvent may be evaporated by the heat treatment, and thus be removed from the carbon nanotube paste 250a.

Figure 1D:
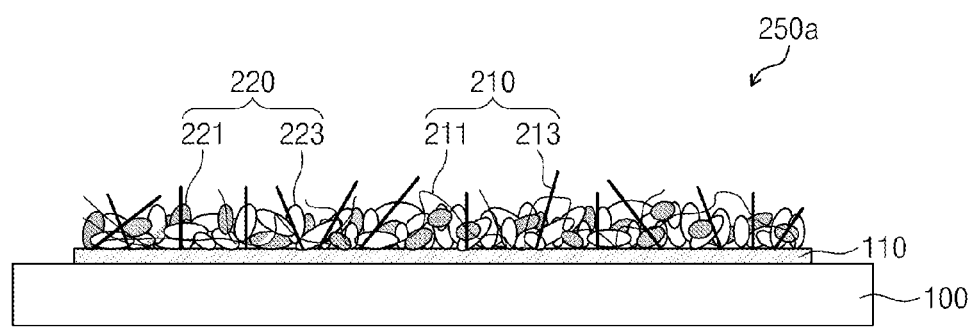

Referring to FIG. 1D, the carbon nanotube paste 250a may be fired (or calcined). As an example, in an atmosphere, the carbon nanotube paste 250a may be heat-treated and cured at a temperature of from about 300° C. to about 500° C. Due to the firing (or calcinations), the organic binder may be burnt out and removed and the inorganic filler 220 may be melted.

Figure 1E:
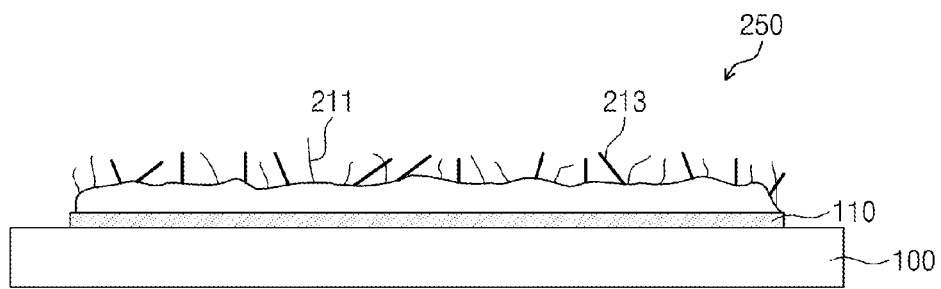
Figure 1F:
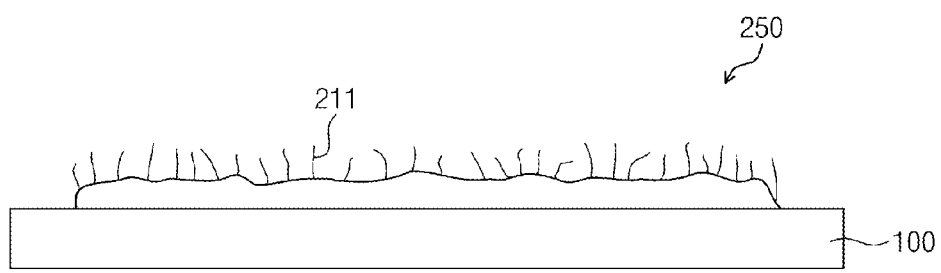
FIG. 1F is a cross-sectional view illustrating a modified example of FIG. 1E.

Referring to FIG. 1E, through the firing (or calcination), the carbon nanotube paste 250a may be formed into a field emitter 250. The field emitter 250 may be surface-treated for surface activation. For example, the field emitter 250 may be subjected to plasma treatment or high electric field treatment, or may be treated by taping or rolling. The surface activation treatment may allow the carbon nanotubes 211 to be vertically aligned.

The field emitter 250 manufactured through a series of processes described above may include the carbon nanotubes 211 and the photoelectric material 221. Accordingly, the field emitter 250 may separately or simultaneously allow cold electron emission to be generated from the carbon nanotubes 211 by a field effect and allow photo electron emission to be generated from the photoelectric material 221 by light. The nanowires 213 may generate cold electron emission and photo electron emission at the same time.

Referring to FIG. 1F, in manufacture of the field emitter 250, the process of forming the photoelectric material layer 110 as illustrated in FIG. 1A may be skipped. When forming the carbon nanotube paste 250a, the nanowires 213 illustrated in FIG. 1B may not be added.

<Example 1 Of Field Emission Device>

Figure 2A:
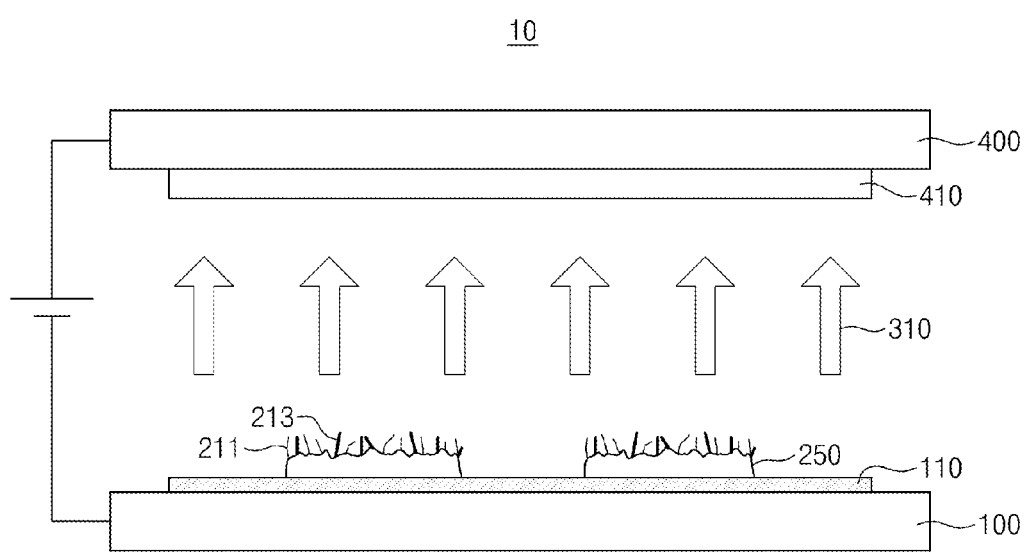
FIG. 2A is a cross-sectional view of a field emission device according to an embodiment of the present invention.
Figure 2B:
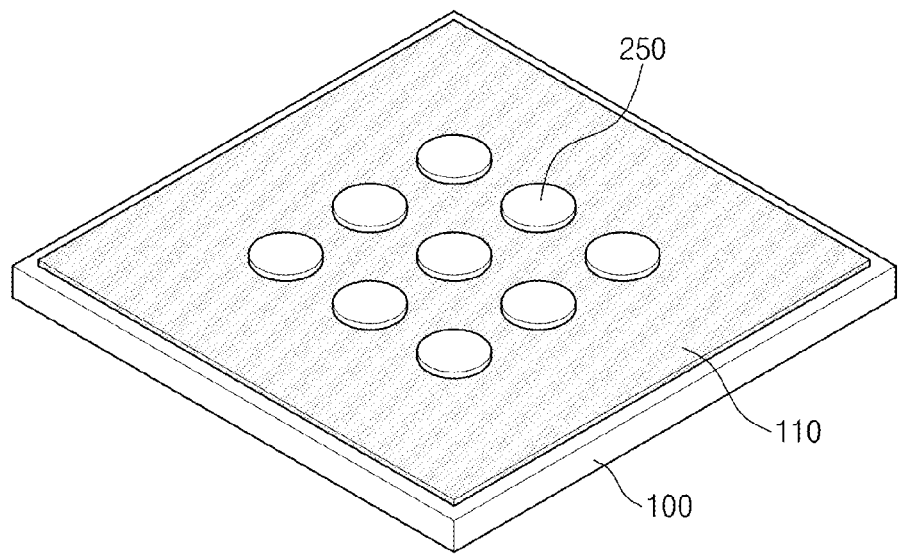
FIG. 2B is an enlarged perspective view illustrating a part shown in FIG. 2A.
Figure 2C:
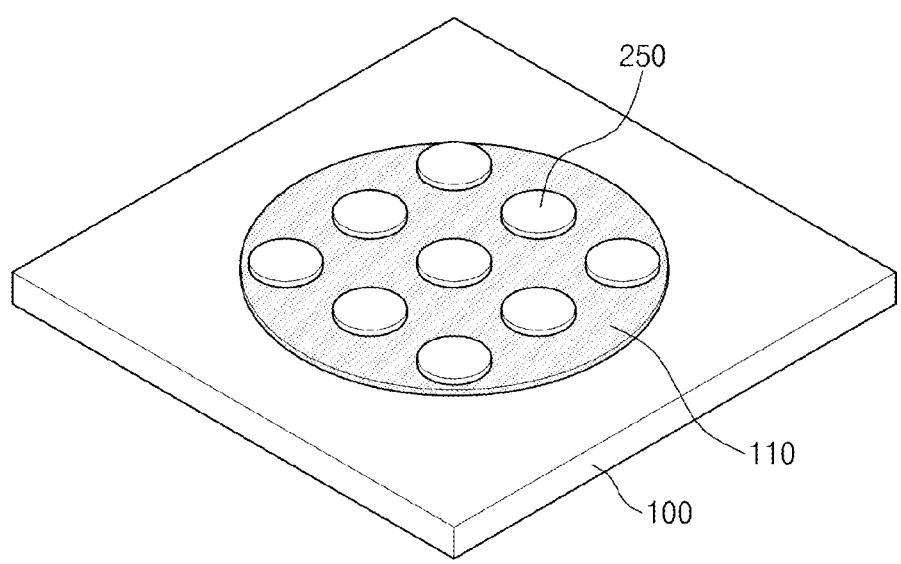
FIG. 2C is a perspective view illustrating a modified example of FIG. 2B.

FIG. 2A is a cross-sectional view of a field emission device according to an embodiment of the present invention. FIG. 2B is an enlarged perspective view illustrating a part shown in FIG. 2A. FIG. 2C is a perspective view illustrating a modified example of FIG. 2B.

Referring to FIG. 2A, the field emission device 10 may have a diode structure including a cathode electrode 100 and an anode electrode 400, which are opposite to each other, a photoelectric material layer 110 and a field emitter 250 which are provided on the cathode electrode 100, and a counter layer 410 provided on the anode electrode 400. The field emitter 250 may be manufactured through processes identical or similar to those as described with reference to FIGS. 1A to 1E.

The anode electrode 400 may include a metal such as nickel (Ni), cobalt (Co), copper (Cu), gold (Au), silver (Ag) and an alloy thereof or may include a transparent conductor made of, for example, indium tin oxide (ITO).

The counter layer 410 may be a fluorescent layer or a metallic target. As an example, when the field emission device 10 is applied to a field emission display, the counter layer 410 may include a fluorescent layer. The fluorescent layer may have a single-film structure of a white fluorescent substance, or a structure in which red, green, and blue fluorescent substances are spaced by light shielding films. As another example, when the field emission device 10 is applied to a field emission X-ray tube, the counter layer 410 may be a metallic target. The metallic target may include tungsten (W), molybdenum (Mo), yttrium (Y), and tantalum (Ta), and silver (Ag) which generate X-rays by collision of electrons.

The photoelectric material layer 110, as illustrated in FIG. 2B, may almost or completely cover the entire surface of the cathode electrode 100. The field emitter 250 may be provided in plurality. A plurality of field emitters 250 may be regularly arranged on a surface of the photoelectric material layer 110. The field emission device 10 having the structure illustrated in FIG. 2B may be applied to a field emission lamp since electron beam focusing is not required.

As another example, the photoelectric material layer 110, as illustrated in FIG. 2C, may be restrictively formed in a local area of the cathode electrode 100. The field emission device 10 having the structure as described above may be applied to a field emission X-ray tube requiring electron beam focusing.

<Example Of Field Emission Mode>

Figure 3:
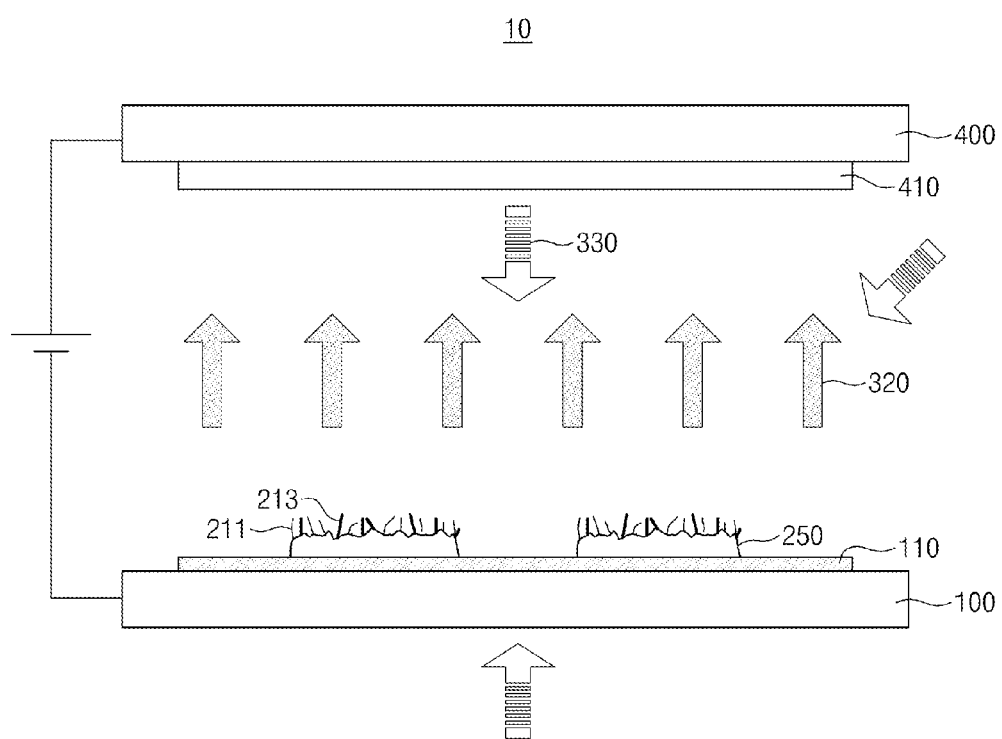
FIGS. 3 and 4 are cross-sectional views illustrating a field emission mode of the field emission device of FIG. 2A.
Figure 4:
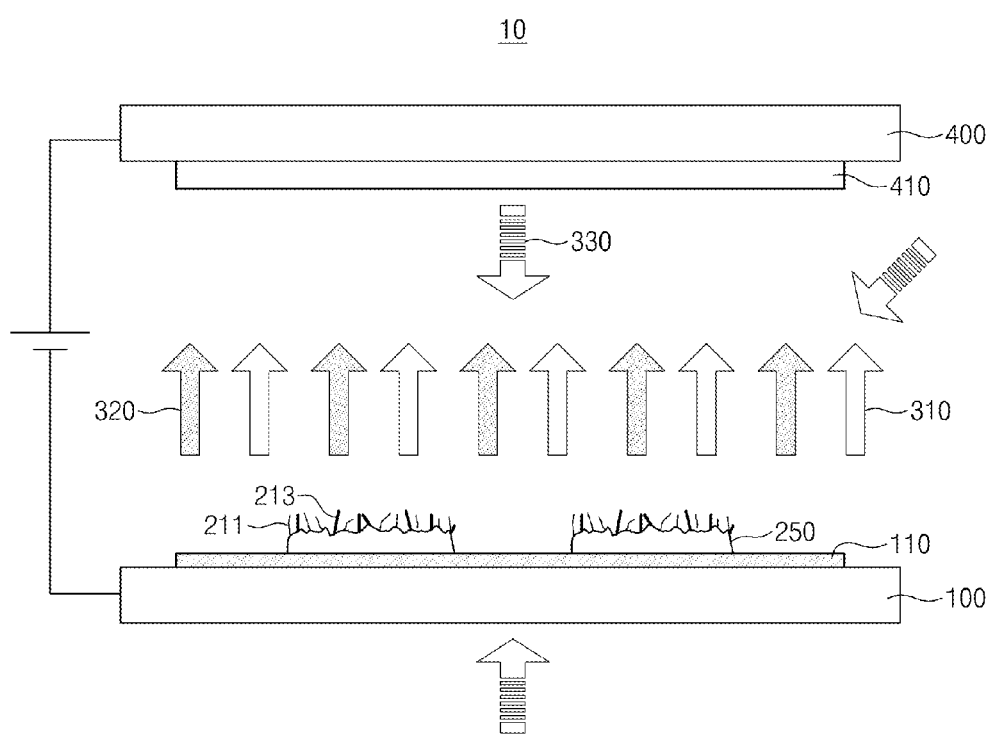

FIGS. 3 and 4 are cross-sectional views illustrating a field emission mode of the field emission device 10.

Referring again to FIG. 2A, when an electric field exceeding a threshold field of the field emitter 250 is applied such that the anode electrode 400 has a higher electric potential than the cathode electrode 100, electrons emitted from the field emitter 250 by the electric field are attracted toward the anode electrode 400. Therefore, cold electron emission 310, which is an electron beam, may be generated, directing from the cathode electrode 100 toward the anode electrode 400. The cold electron emission 310 may be generated from the carbon nanotubes 211 and the nanowires 213.

Referring to FIG. 3, when an electric field is not applied to the field emission device 10 but light 330 is incident from the outside, photo electron emission 320 may occur. For example, when the light 330 provided from the outside is incident on the field emitter 250, the photo electron emission 320 may be generated from the photoelectric material 221 of the field emitter 250. The photo electron emission 320 may also be generated from the nanowires 213 and/or the photoelectric material layer 110. As illustrated in FIG. 2B, when the photoelectric material layer 110 is formed on the entire surface of the cathode electrode 100, the photo electron emission 320 may be maximized. As illustrated in FIG. 2C, when the photoelectric material layer 110 is formed on a portion of the surface of the cathode electrode 100, the photo electron emission 320 may be effectively obtained while not interfering with electron beam focusing.

The light 330 may be provided from photoluminescence, cathodeluminescence, or X-rays. The light 330 may be directly provided to the field emitter 250 or may be provided through energy transfer from an opposite side of the surface of the cathode electrode 100 where the field emitter 250 is disposed.

Referring to FIG. 4, when the light 330 is provided from the outside in a state where an electric field is applied between the anode electrode 400 and the cathode electrode 100, the cold electron emission 310 and the photo electron emission 320 may be generated at the same time. Accordingly, the field emission device 10 may obtain a relatively higher current or relatively higher current density. The nanowires 213 may generate the cold electron emission 310 and the photo electron emission 320 at the same time, thereby contributing to a current increase in the field emission device 10.

<Example 2 Of Field Emission Device>

Figure 5A:
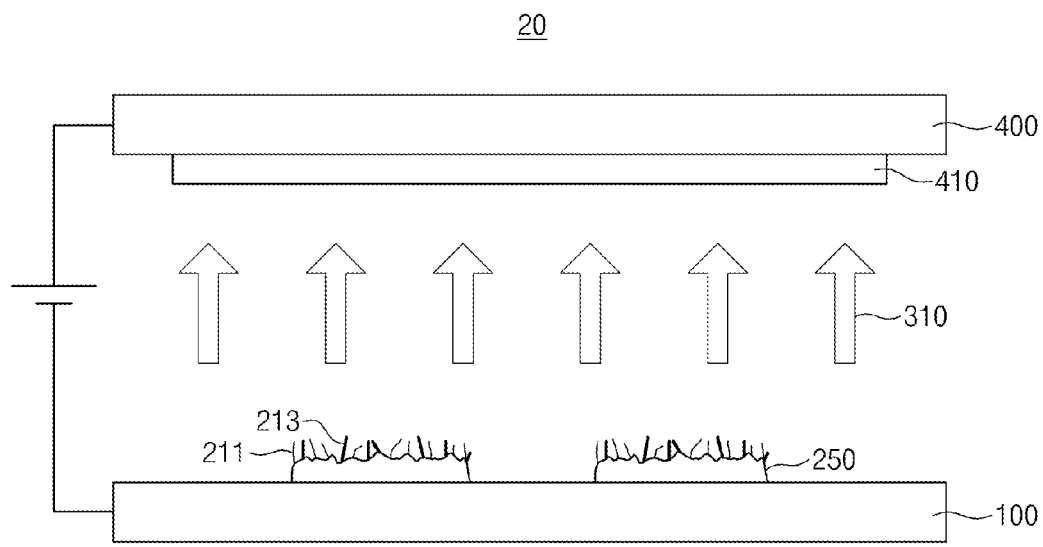
FIG. 5A is a cross-sectional view of a field emission device according to another embodiment of the present invention.
Figure 5B:
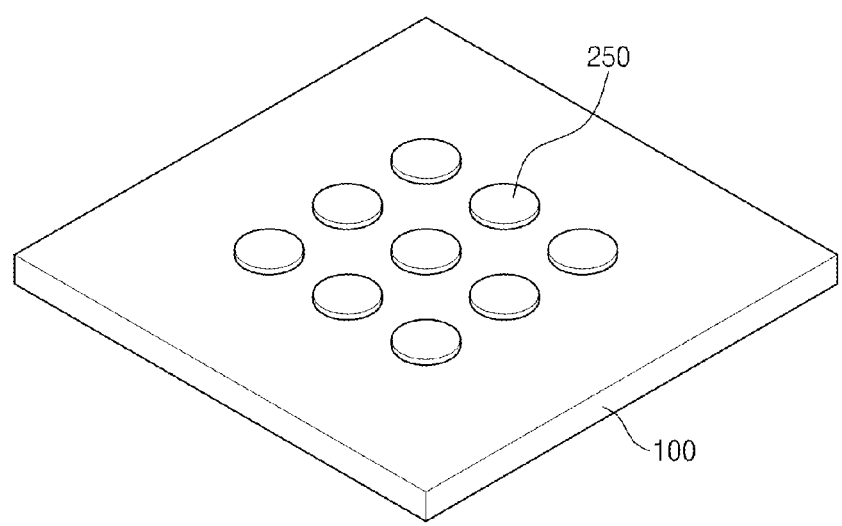
FIG. 5B is an enlarged perspective view illustrating a part shown in FIG. 5A.

FIG. 5A is a cross-sectional view of a field emission device 20 according to another embodiment of the present invention. FIG. 5B is an enlarged perspective view illustrating a part shown in FIG. 5A.

Referring to FIGS. 5A and 5B, as described with reference to FIG. 1F, the field emission device 20 having a diode structure may be manufactured by skipping the process of forming the photoelectric material layer 110. A plurality of field emitters 250 may be regularly arranged on a surface of the cathode electrode 100. When an electric field is applied to the field emission device 20, the cold electron emission 310 may be generated from the field emitter 250.

As another example, as described with reference to FIG. 3, the photo electron emission 320 may be generated from the nanowires 213 and/or the photoelectric material (see 211 in FIG. 1F) in the field emitter 250 by providing light without applying an electric field. As still another example, as described with reference to FIG. 4, the field emission device 20 may generate the cold electron emission 310 and the photo electron emission 320 at the same time by applying an electric field and providing light.

<Example 3 Of Field Emission Device>

Figure 6A:
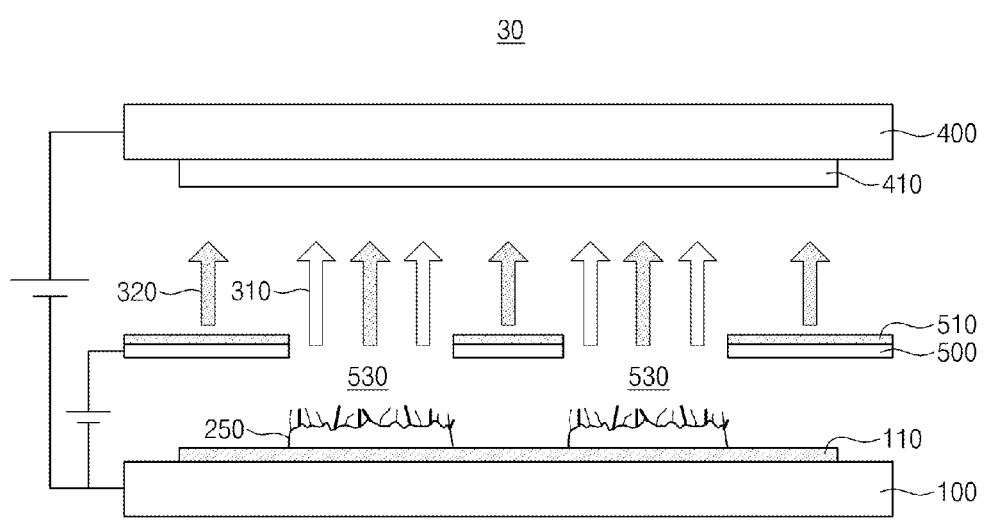
FIG. 6A is a cross-sectional view of a field emission device according to still another embodiment of the present invention.
Figure 6B:
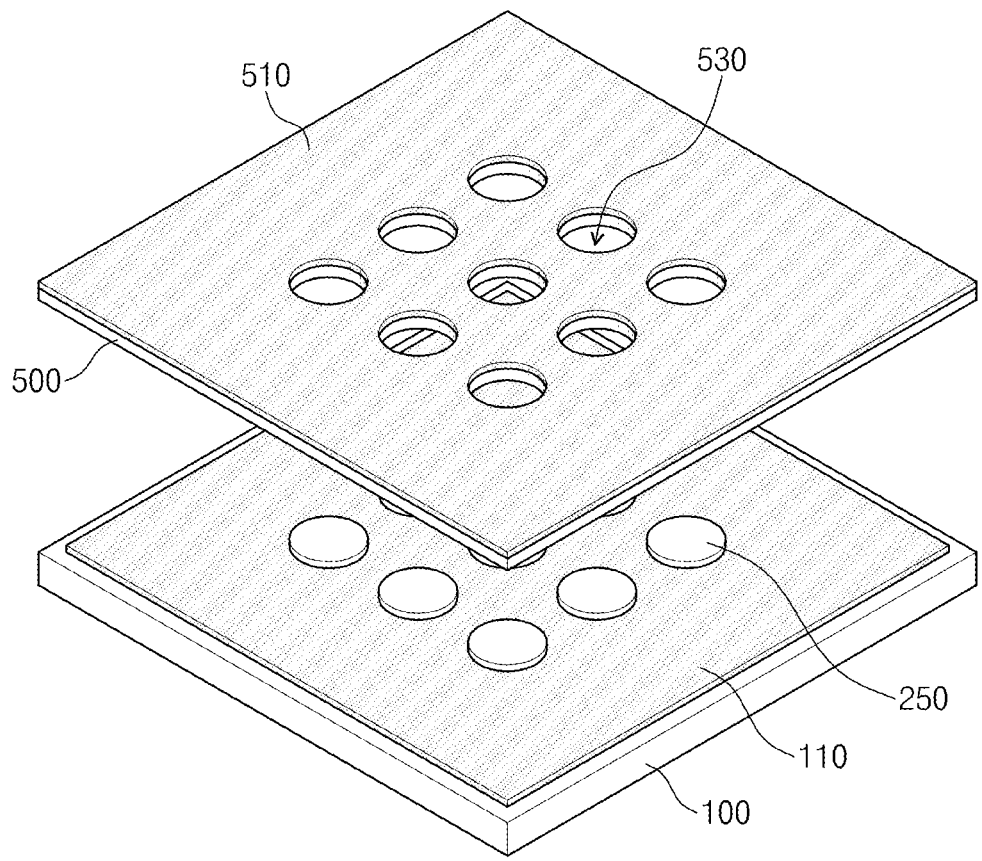
FIG. 6B is an enlarged perspective view illustrating a part shown in FIG. 6A.
Figure 6C:
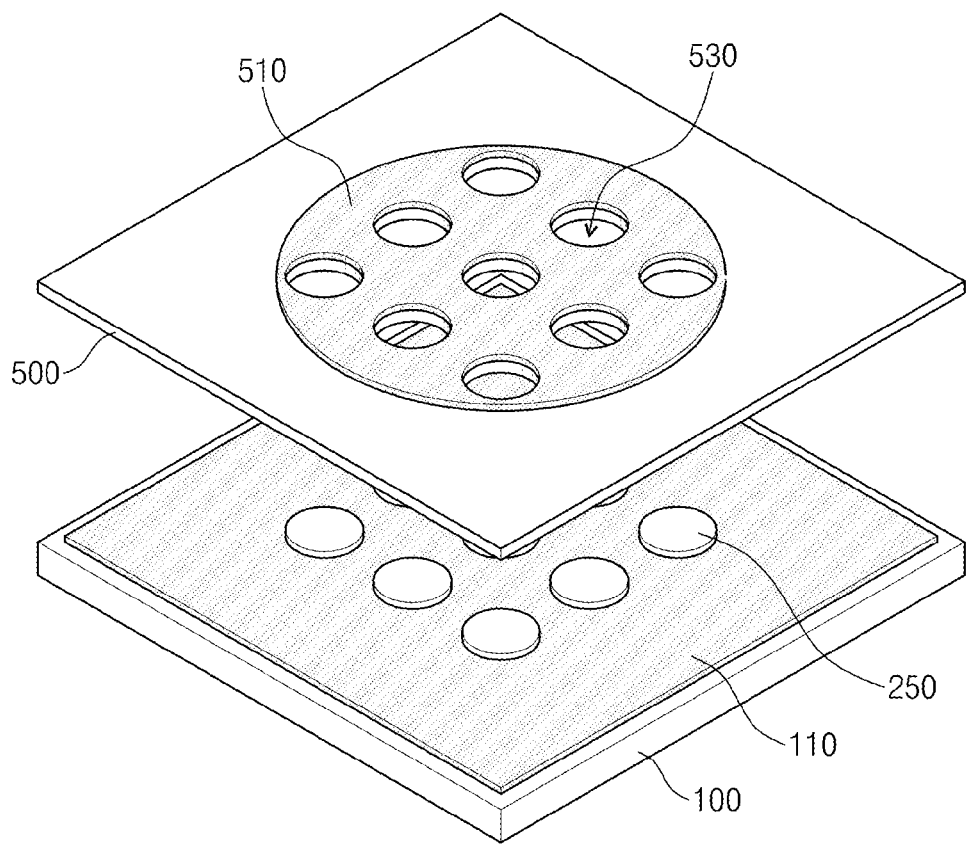
FIG. 6C is a perspective view illustrating a modified example of FIG. 6B.

FIG. 6A is a cross-sectional view of a field emission device 30 according to still another embodiment of the present invention. FIG. 6B is an enlarged perspective view illustrating a part shown in FIG. 6A. FIG. 6C is a perspective view illustrating a modified example of FIG. 6B.

Referring to FIG. 6A, the field emission device 30 may have a triode structure including an anode electrode 400 provided with a counter layer 410, a cathode electrode 100 provided with a photoelectric material layer 110 and a field emitter 250, and a gate electrode 500 provided with a second photoelectric material layer 510. The field emitter 250 may be manufactured through processes identical or similar to those as described with reference to FIGS. 1A to 1E. The second photoelectric material layer 510 may include a material identical or similar to that of the photoelectric material layer 110.

The gate electrode 500 may be provided between the cathode electrode 100 and the anode electrode 400, which are separated spatially. The cold electron emission 310 is generated from the field emitter 250 due to an electric field between the gate electrode 500 and the cathode electrode 100. Electrons emitted by the electric field between the cathode electrode 100 and the anode electrode 400 may be accelerated toward the anode electrode 400. A voltage higher than a voltage applied to the gate electrode 500 may be applied to the anode electrode 400. The field emission device 30 having the triode structure may independently control an amount of electrons and acceleration energy of the emitted electrons.

The gate electrode 500, as illustrated in FIG. 6B, may have a plate shape including a plurality of gate holes 530 aligned perpendicular to the field emitter 250. The second photoelectric material layer 510 may cover the entire surface of the gate electrode 500 facing the anode electrode 400.

According to an example, the photo electron emission 320 may be generated by photons generated in a space between the anode electrode 400 and the gate electrode 500, for example, by light provided from the outside. For example, the photons may transfer energy to the second photoelectric material layer 510, and furthermore, may transfer energy to the photoelectric material layer 110 and the photoelectric material 211 of the field emitter 250 through the gate holes 530. Accordingly, the photo electron emission 320 may be generated from the photoelectric material 211, the photoelectric material layer 110, and the second photoelectric material layer 510 of the field emitter 250.

As described above, the field emission device 30 having the triode structure may generate the cold electron emission 310 and the photo electron emission 320 at the same time, thereby maximizing an emission current. In addition, the field emission device 30 may control the cold electron emission 310 and the photo electron emission 320 independently.

As illustrated in FIG. 6B, when the second photoelectric material layer 510 covers the entire surface of the gate electrode 500, the photo electron emission 320 may be maximized. The field emission device 30 having the structure illustrated in FIG. 6B may be applied to a field emission lamp, in which electron beam focusing is not considered significant.

As another example, as illustrated in FIG. 6C, the second photoelectric material layer 510 may be restrictively formed on a portion of the surface of the gate electrode 500, thereby effectively obtaining the photo electron emission 320 while not interfering with the electron beam focusing. The field emission device 30 having the structure described above may be applied to a field emission X-ray tube requiring the electron beam focusing.

In case of a field emission device having a multi-electrode structure other than the triode structure, a photoelectric material layer is formed on each electrode, thereby obtaining an effect described above.

<Example 4 Of Field Emission Device>

Figure 7A:
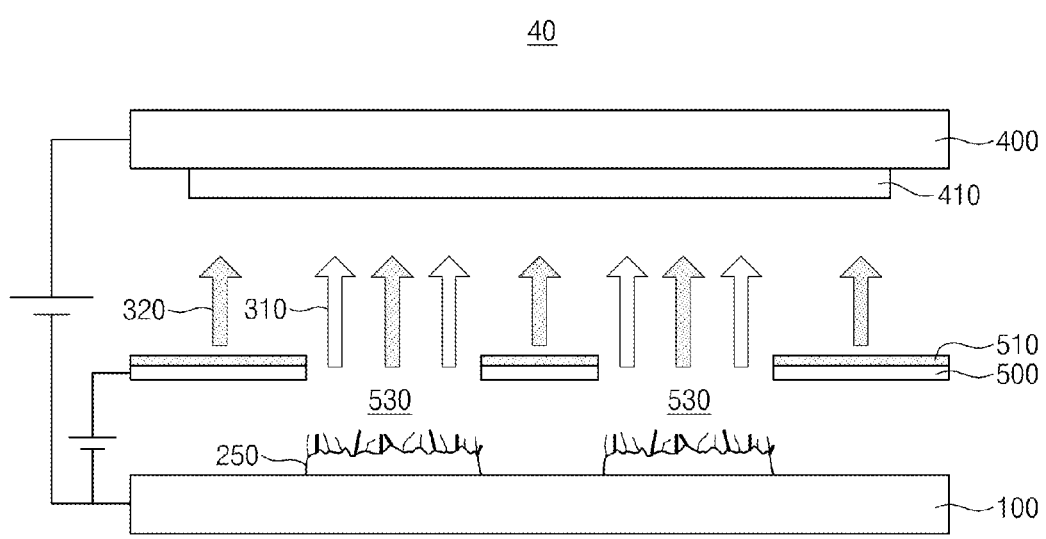
FIG. 7A is a cross-sectional view of a field emission device according to even another embodiment of the present invention.
Figure 7B:
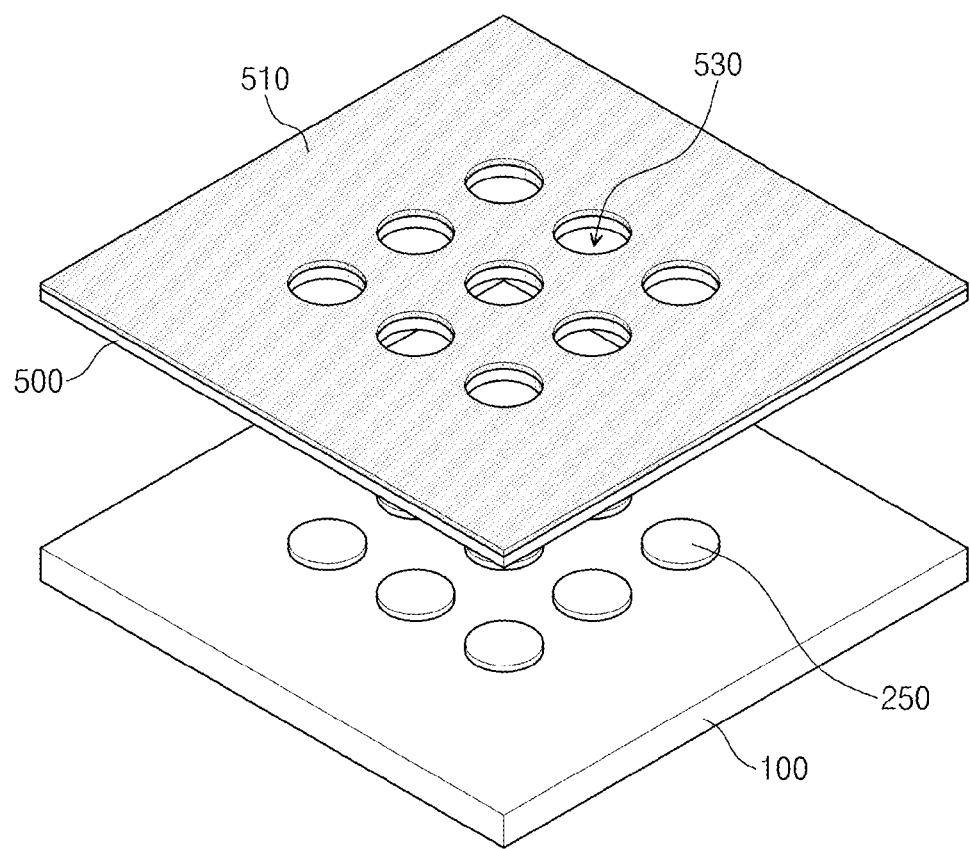
FIG. 7B is an enlarged perspective view illustrating a part shown in FIG. 7A.

FIG. 7A is a cross-sectional view of a field emission device 40 according to even another embodiment of the present invention. FIG. 7B is an enlarged perspective view illustrating a part shown in FIG. 7A.

Referring to FIG. 7A, the field emission device 40 may have a triode structure including an anode electrode 400 provided with a counter layer 410, a cathode electrode 100 provided with a field emitter 250, and a gate electrode 500 provided with a second photoelectric material layer 510. The field emission device 40, as similar to the field emission device 30, may generate cold electron emission 310 and photo electron emission 320 at the same time.

Referring to FIG. 7B, the cathode electrode 100 may not be provided with a photoelectric material layer 110 illustrated in FIG. 6B. For example, due to the presence of the gate electrode 500, an amount of photons passing through the gate holes 530 and arriving at the cathode electrode 100 may greatly differ from an amount of photons arriving at the gate electrode 500. Accordingly, the process of forming the photoelectric material layer 110 on the cathode electrode 100 may be skipped.

<Example 5 Of Field Emission Device>

Figure 8A:
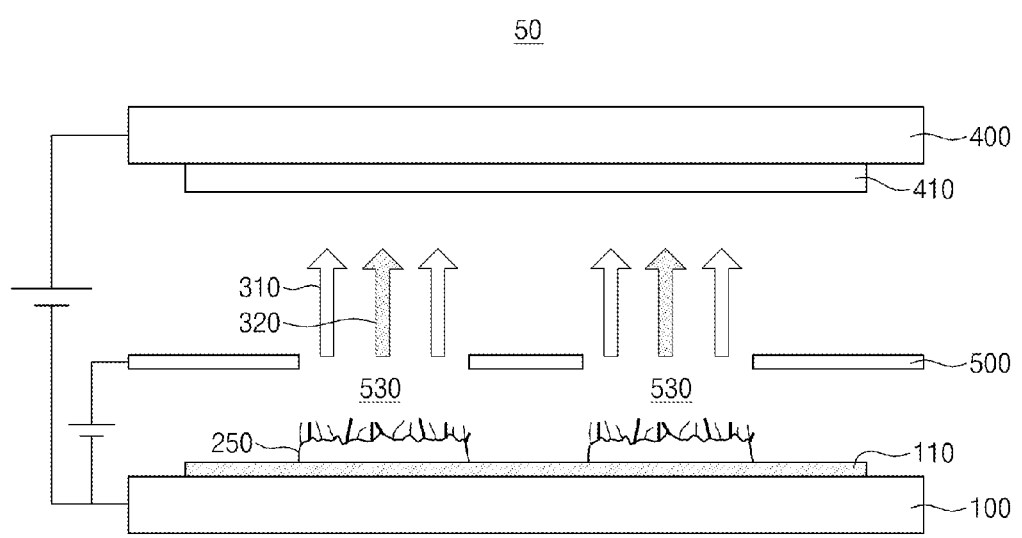
FIG. 8A is a cross-sectional view of a field emission device according to yet another embodiment of the present invention.
Figure 8B:
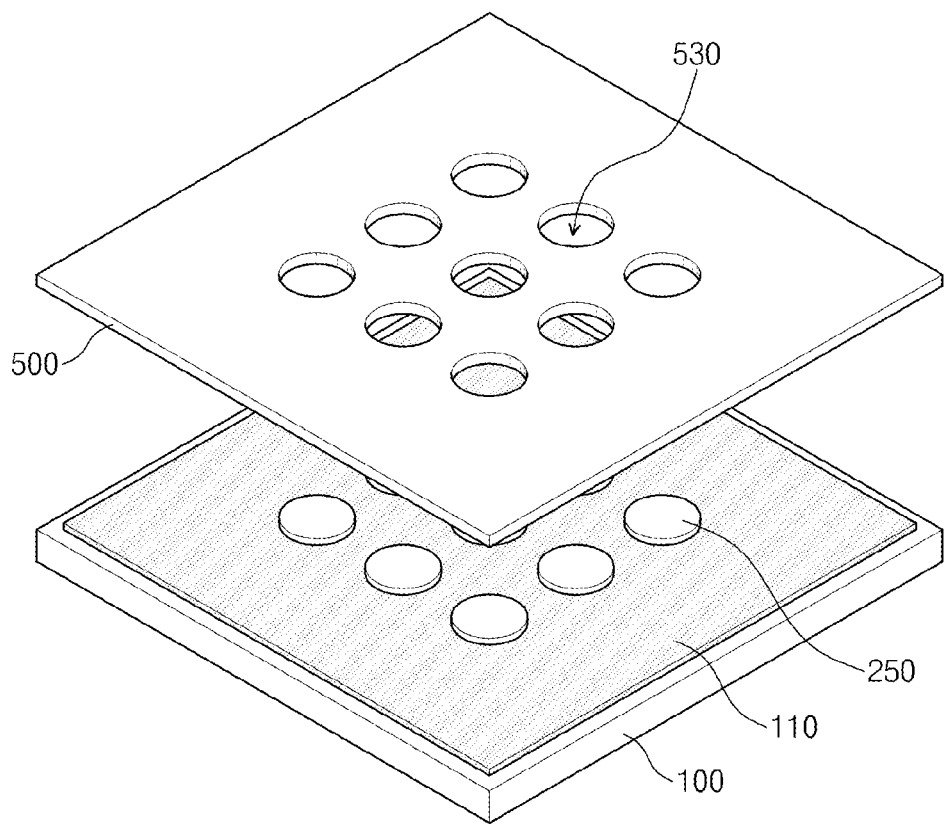
FIG. 8B is an enlarged perspective view illustrating a part shown in FIG. 8A.

FIG. 8A is a cross-sectional view of a field emission device 50 according to yet another embodiment of the present invention. FIG. 8B is an enlarged perspective view illustrating a part shown in FIG. 8A.

Referring to FIGS. 8A and 8B, the field emission device 50 may have a triode structure including an anode electrode 400 provided with a counter layer 410, a cathode electrode 100 provided with a photoelectric material layer 110 and a field emitter 250, and a gate electrode 500 provided between the cathode electrode 100 and the anode electrode 400. The gate electrode 500 may not be provided with a second photoelectric material layer 510 illustrated in FIG. 6B.

The field emission device 50 may simultaneously generate the cold electron emission 310 caused by a field effect, and the photo electron emission 320 caused by incident light passing through the gate hole 530 and arriving at the photoelectric material layer 110.

<Example 6 Of Field Emission Device>

Figure 9A:
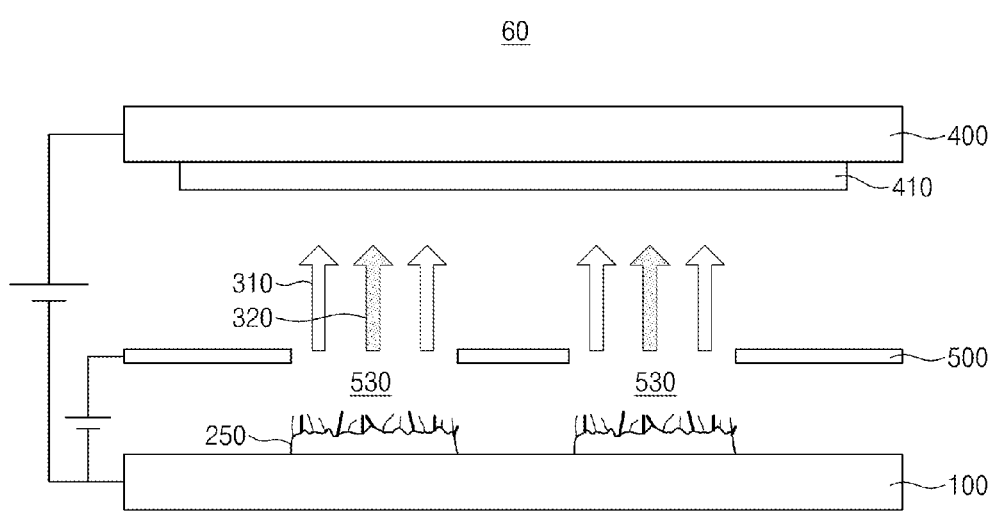
FIG. 9A is a cross-sectional view of a field emission device according to a further embodiment of the present invention.
Figure 9B:
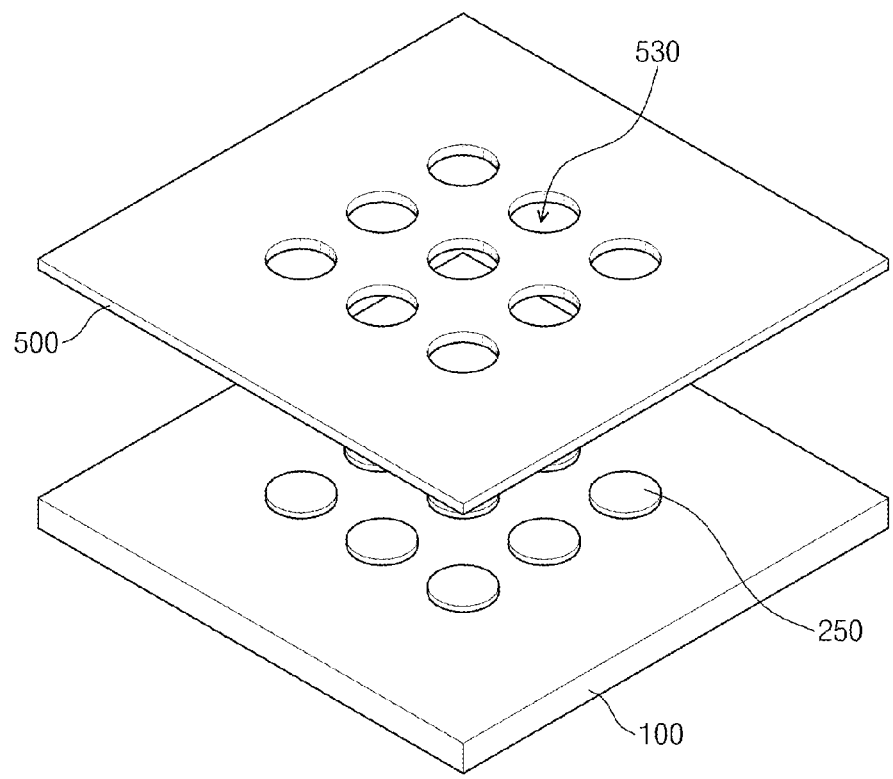
FIG. 9B is an enlarged perspective view illustrating a part shown in FIG. 9A.

FIG. 9A is a cross-sectional view of a field emission device 60 according to a further embodiment of the present invention. FIG. 9B is an enlarged perspective view illustrating a part shown in FIG. 9A.

Referring to FIGS. 9A and 9B, the field emission device 60 may have a triode structure including an anode electrode 400 provided with a counter layer 410, a cathode electrode 100 provided with a field emitter 250, and a gate electrode 500 provided between the cathode electrode 100 and the anode electrode 400. The cathode electrode 100 and the gate electrode 500 may not be provided with a photoelectric material layer 110 and a second photoelectric material layer 510 illustrated in FIG. 6B.

Even through a photoelectric material layer is not provided, the field emission device 60 may simultaneously generate the cold electron emission 310 caused by a field effect, and the photo electron emission 320 caused by incident light passing through the gate hole 530 and arriving at the field emitter 250.

The field emitter 250 described herein may be applied not only to a field emission lamp or a field emission X-ray tube described above, but also to a field emission display, a traveling wave tube, a terahertz generator, etc.

The afore-mentioned devices like the field emission X-ray, the field emission display, etc., generally need high current density. To obtain high current density, the number of electrons emitted from each carbon nanotube increases, causing Joule heating to occur in the carbon nanotube. When Joule heating occurs, the carbon nanotubes are deteriorated to be incapable of acting as a field emitter, and thus desirable performance may not be expected. According to the embodiments described above, cold electron emission and photo electron emission may be obtained at the same time, thereby providing high current density.

According to the present invention, when a photoelectric material and nanowires are added to a carbon nanotube paste, not only cold electron emission but also photo electron emission may occur in a field emission device. Conditions for the field emission device requiring a high current or high current density may be easily satisfied using the cold electron emission and the photo electron emission. Additionally, a current amount necessary for each field emitter may also be reduced.

When a photoelectric material layer is formed on a cathode or gate electrode, or each electrode of a multi-electrode structure, an additional photocurrent may be generated. Accordingly, a cold electron emission current and a photo electron emission current are used at the same time, and it is thus possible to realize the field emission device having excellent current characteristics.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A field emission device comprising:
    an anode electrode and a cathode electrode which are opposite to each other;
    a counter layer provided on the anode electrode; and
    a field emitter provided on the cathode electrode and facing the counter layer,
    wherein the field emitter comprises a carbon nanotube that emits cold electrons and a photoelectric material that emits photo electrons.

2. The device of claim 1, further comprising a first photoelectric material layer provided between the cathode electrode and the field emitter,
    wherein the first photoelectric material layer totally or partially covers a surface of the cathode electrode, the surface of the cathode electrode facing the anode electrode.

3. The device of claim 2, wherein at least one of the photoelectric material and the first photoelectric material layer comprises one of potassium oxide, cesium oxide, gallium phosphide, gallium nitride, aluminum, indium arsenide, germanium, silicon, gallium arsenide, cesium telluride, cesium iodide, cesium-potassium-tellurium (Cs—K—Te), potassium-tellurium (K—Te), silver-oxygen-cesium (Ag—O—Cs), indium-gallium-arsenic (In—Ga—As), and a combination thereof.

4. The device of claim 1, wherein the counter layer comprises one of a florescent layer and a metallic target.

5. The device of claim 1, further comprising a gate electrode provided between the cathode electrode and the anode electrode.

6. The device of claim 5, further comprising a second photoelectric material layer provided on a surface of the gate electrode, the surface of the gate electrode facing the anode electrode.

7. The device of claim 6, further comprising a first photoelectric material layer provided between the cathode electrode and the field emitter,
wherein the second photoelectric material layer comprises the same material as the first photoelectric material layer.

8. The device of claim 6, wherein the second photoelectric material layer totally or partially covers the surface of the gate electrode facing the anode electrode.

9. The device of claim 5, wherein the field emitter comprises a plurality of local field emitters distributed on the cathode electrode.

10. The device of claim 9, wherein the gate electrode comprises a plurality of holes aligned with the plurality of local field emitters.

11. The device of claim 1, wherein the field emitter further comprises nanowires, and
wherein the nanowires each comprises one of gold (Au), silver (Ag), gallium arsenide, and a combination thereof.

12. A field emission device comprising:
an anode electrode provided with a counter layer;
a cathode electrode spaced from the anode electrode and provided with a field emitter facing the counter layer; and
a first photoelectric material layer provided between the cathode electrode and the field emitter,
wherein the field emitter comprises:
a field emission paste formed by melting and curing a photoelectric material and metal particles; and
a carbon nanotube provided on the field emission paste and projecting from the field emitter toward the anode electrode,
wherein cold electron emission caused by a field effect is generated from the carbon nanotube, and
wherein photo electron emission caused by incident light is generated from the photoelectric material.

13. The device of claim 12, wherein the field emitter further comprises nanowires provided on the field emission paste, the nanowires projecting from the field emission paste.

14. The device of claim 12, further comprising a gate electrode provided between the cathode electrode and the anode electrode and spaced from the cathode electrode and the anode electrode,
wherein the gate electrode includes a gate hole through which the cold electron emission and the photo electron emission pass.

15. The device of claim 14, further comprising a second photoelectric material layer totally or partially covering a surface of the gate electrode, the surface of the gate electrode facing the anode electrode,
wherein the second photoelectric material layer comprises the same material as the first photoelectric material.

16. A method of manufacturing a field emission device, comprising:
forming a carbon nanotube paste, which consists of carbon nanotubes, a photoelectric material, metal particles, an organic binder, and a solvent, on a cathode electrode;
removing the solvent by drying the carbon nanotube paste;
removing the organic binder by firing the carbon nanotube paste and melting the photoelectric material and the metal particles; and
treating a field emitter formed by melting the photoelectric material and the metal particles to allow a surface of the field emitter to be activated,
wherein the photoelectric material comprises a material having a lower critical frequency than a frequency of light incident on the field emitter.

17. The method of claim 16, wherein the photoelectric material comprises one of potassium oxide, cesium oxide, gallium phosphide, gallium nitride, aluminum, indium arsenide, germanium, silicon, gallium arsenide, cesium telluride, cesium iodide, cesium-potassium-tellurium (Cs—K—Te), potassium-tellurium (K—Te), silver-oxygen-cesium (Ag—O—Cs), indium-gallium-arsenic (In—Ga—As), and a combination thereof.

18. The method of claim 16, further comprising:
providing an anode electrode opposite to the cathode electrode; and
forming a counter layer on the anode electrode to face the field emitter,
wherein the counter layer comprises one of a fluorescent layer and a metallic target.

19. The method of claim 18, further comprising, before the forming of the carbon nanotube paste, forming a first photoelectric material layer on the cathode electrode.

20. The method of claim 19, further comprising:
forming a gate electrode between the cathode electrode and the anode electrode, which are separated spatially; and
forming, on the gate electrode, a second photoelectric material layer facing the counter layer.

* * * * *